(12) United States Patent
Bello Rivera et al.

(10) Patent No.: US 11,043,800 B2
(45) Date of Patent: Jun. 22, 2021

(54) ENERGY STORAGE COMPONENTS TO POWER LOADS DURING TRANSITIONS BETWEEN POWER SUPPLIES

(71) Applicant: Hewlett Packard Enterprise Development LP, Houston, TX (US)

(72) Inventors: Mark Isagani Bello Rivera, Cypress, TX (US); Stephen Airey, Houston, TX (US); Daniel Humphrey, Tomball, TX (US); David P. Mohr, Spring, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 797 days.

(21) Appl. No.: 15/720,418

(22) Filed: Sep. 29, 2017

(65) Prior Publication Data
US 2019/0103740 A1 Apr. 4, 2019

(51) Int. Cl.
*H02H 3/00* (2006.01)
*H02H 3/06* (2006.01)
*G06F 1/26* (2006.01)
*G06F 1/30* (2006.01)
*H02H 3/12* (2006.01)
*G06F 1/28* (2006.01)
*H02H 1/06* (2006.01)

(52) U.S. Cl.
CPC .............. *H02H 3/06* (2013.01); *G06F 1/263* (2013.01); *G06F 1/28* (2013.01); *G06F 1/30* (2013.01); *H02H 3/12* (2013.01); *H02H 1/06* (2013.01)

(58) Field of Classification Search
None
See application file for complete search history.

(56) References Cited

U.S. PATENT DOCUMENTS

| | | | |
|---|---|---|---|
| 7,279,995 B2 | 10/2007 | Kernahan et al. | |
| 8,732,506 B2 | 5/2014 | Nishtala et al. | |
| 9,071,053 B2 | 6/2015 | Harris et al. | |
| 9,300,171 B2 * | 3/2016 | Moth | H02J 9/062 |
| 9,552,053 B2 | 1/2017 | O'Connor et al. | |
| 2016/0116932 A1 | 4/2016 | Yokoyama et al. | |
| 2016/0147276 A1 | 5/2016 | Chen | |

OTHER PUBLICATIONS

Meisner, D. et al., "Power Nap: Eliminating Server Idle Power"; Mar. 7-11, 2009, 12 pages.

* cited by examiner

*Primary Examiner* — Stephen W Jackson
(74) *Attorney, Agent, or Firm* — Hewlett Packard Enterprise Patent Department

(57) ABSTRACT

Examples relate to power supply system comprising a primary power supply to deliver a first power to a load and a secondary power supply that, in response to a failure in the primary power supply, is to deliver a second power to the load. The system further comprises a primary energy storage component coupled to the primary power supply that, in response to the failure in the primary power supply, is to deliver a third power to the load while the secondary power supply transitions from a lesser output power level to a greater output power level. The third power is at the same full-rated power level than the first power.

19 Claims, 5 Drawing Sheets

ENERGY STORAGE COMPONENTS TO POWER LOADS DURING TRANSITIONS BETWEEN POWER SUPPLIES

BACKGROUND

Server systems may be designed to manage power received from power supplies based on the instant demand of loads connected to the server systems. Generally, as load demand increases power delivered by the server system may also increase, and vice versa. These server systems may comprise redundant power supplies that may be used as a backup of main power supplies. However, power supplies in offline mode that receive an instruction to activate (switch to an online mode) may need a transitional period between the instant in which the instruction for activation is received and the instant in which the power supplies are able to work at their full-rated power. Therefore, power supply designs cannot be put into (or taken back from) its offline mode fast enough to respond to the rapidly changing load demands of a server in its everyday real-world workload.

BRIEF DESCRIPTION OF THE DRAWINGS

The following detailed description references the drawings, wherein.

DETAILED DESCRIPTION

Figure 1:
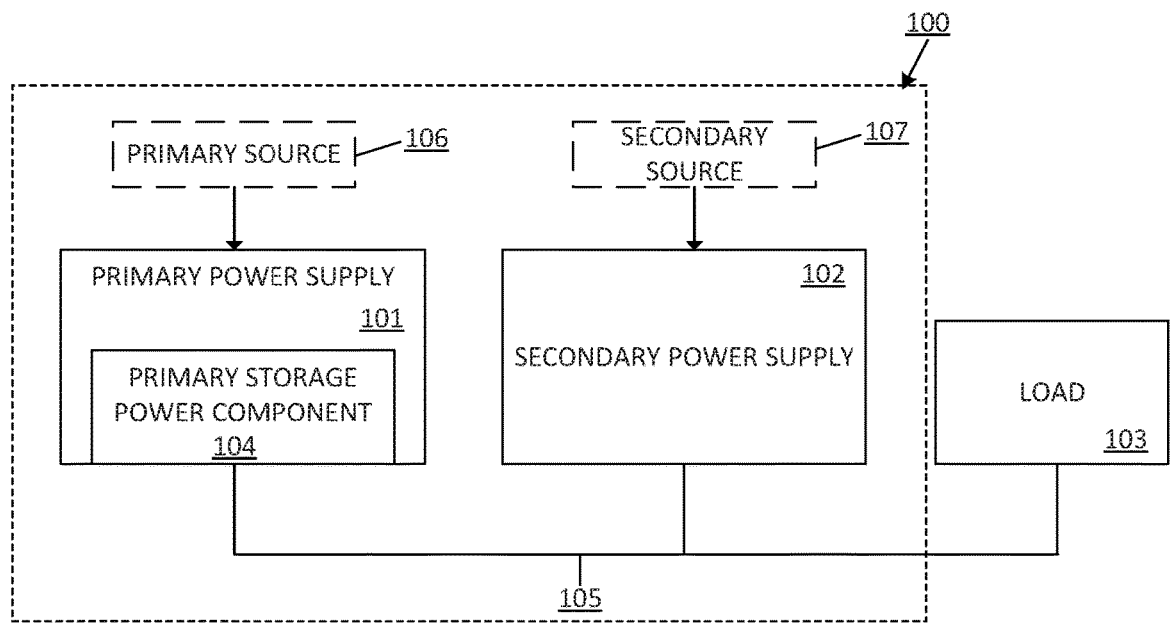
FIG. 1 is a block diagram of an example power supply system with energy storage components, wherein the energy storage components are to power the load during transitions between power supplies.

In server systems with redundant power supplies, such as in a 1+1, N+1 or N+N redundancy configuration, redundant power supplies may be placed in offline mode to conserve input power consumption during the times the main power supplies are operating normally. These redundant power supplies may be used by the server systems as a backup that may activate in case a failure happens in any of the main power supplies. However, power supplies may need a transitional period from the instant they activate and firstly receive the electrical energy from a source of electrical power to the instant in which the power supplies are at their full-rated power. Therefore, power supplies may not be taken back from its offline mode fast enough to respond to the rapidly changing load demands of a server in its everyday real-world workload.

To address these issues, examples disclosed herein describe an example power supply system for powering a load by storage energy components during transitions between power supplies in order to increase reliability of the power supply system. The power supply system may comprise a primary power supply that may be to deliver a first power to a load and a secondary power supply that that may be to deliver a second power to the load in response to a failure in the primary power supply. The failure may provoke the primary power supply to be taken out (at least partially) of its online mode. As a result of the failure, the primary power supply may not be able to provide enough energy for the normal functioning of the load and may automatically turn off. The power supply system may further comprise a primary energy storage component coupled to the primary power supply that may be to deliver a third power to the load while the secondary power supply transitions from a lesser output power level to a greater output power level and wherein the third power may be at the same full-rated power level of the first power. Thus, the primary energy storage component may be to deliver the third power to the load between the instant in which the primary power supply may fail, and thus from the instant in which the secondary power supply may turn on and start receiving electrical energy form an external independent source of electrical energy, and the instant in which the secondary power supply may be working at its greater output power level.

In some examples, when the primary power supply recovers from the failure (taken out of its offline mode), the primary energy storage component may start delivering the third power to the load while the primary power supply transitions from a lesser output power level to a greater output power level and the primary power supply is to deliver the first power to the load. Therefore, the primary energy storage component may be to deliver the third power to the load between the instant in which the primary power supply start recovering and receiving electrical energy form the external independent source of electrical energy, and the instant in which the primary power supply may be working at its greater output power level. In some other examples, and depending on the failure from which the primary power supply is recovering, the primary power supply may not transition from a lesser output power level to a greater output power level but it may instantly provide power to the load. In such examples, the primary power supply may instruct the secondary power supply to disconnect and start powering the load.

In some other examples, the secondary power supply may further comprise a secondary energy storage component that may be to deliver the third power to the load in combination with the primary energy storage component while the secondary power supply transitions from the lesser output power level to the greater output power level. This redundancy of energy storage components in the power supply system may improve reliability of the system and may further allow having energy storage components that support lower loads which may reduce heat dissipation requirements, space requirements and costs.

In some other examples, when the secondary power supply is currently powering the load and a failure in the secondary power supply happens, the secondary energy storage component may be also to deliver a fourth power to the load while the primary power supply transitions from the lesser output power level to the greater output power level. The fourth power may be at the same full-rated power level of the second power. In such examples, the secondary energy storage component may be to deliver power to the load between the instant in which the primary power supply activates and start receiving electrical energy form an external independent source of electrical energy, and the instant in which the primary power supply may be working at its greater output power level. In some other examples, the fourth power may be delivered to the load by a combination of the primary energy storage component and the secondary energy storage component. Although the first power and the second power may not provide the same operating level energy, the first power and the second power may provide enough operating level energy to the load for its normal functioning.

As used herein, the "lesser output power level" may refer to an operating level energy delivered by any of the power supplies that may be insufficient for the normal functioning of the load. The "greater output power level" may refer to an operating level energy delivered by any of the power supplies that may be sufficient for the normal functioning of the load. For example, the lesser output power level of a power supply may correspond to an initialization output power level of the power supply and the greater output power level of a power supply may correspond to a full-rated output power level of the power supply. Thus, the energy storage components may be to deliver power to the load between the instant in which the corresponding power supply is instructed to switch on until the instant said power supply may be working at its full-rated power level.

In some examples, a power threshold may be pre-defined to determine the lesser output level and the greater output level of the power supplies. In such examples, the first power provided by the primary power supply (currently powering the load) may be monitored in order to determine whether the first power is below the power threshold. When it is determined that the first power is below the power threshold, the secondary power supply is activated and the load is powered with the third power provided by the primary energy storage component during the transition. Then, once the secondary power supply has reached the greater output power level (second power is above the power threshold), the load is powered by the second power provided with the secondary power supply and the primary energy storage component is turned off. In some other examples, when the secondary power supply is currently powering the load, the second power may be monitored in order to determine whether it is below the power threshold. When it is determined that the second power is below the power threshold, the primary power supply is activated and the load is powered with the fourth power provided by the secondary energy storage component during the transition. Then, once the primary power supply has reached the greater output power level (first power is above the power threshold), the load is powered by the primary power provided with the primary power supply and the secondary energy storage component is turned off.

In some examples, the primary energy storage component and the secondary energy storage component may be a component selected from a group comprising capacitors, supercapacitors, batteries, hybrid-capacitor-battery components and combinations thereof, respectively.

In some other examples, the energy storage components may be hot-pluggable energy storage components attached to the power supplies, standalone energy storage components attached to the power supplies, hot-pluggable energy storage components attached to the server system and external to the power supplies or standalone energy storage components attached to the server system and external to the power supplies In the following description, for purposes of explanation, numerous specific details are set forth in order to provide a thorough understanding of the present systems and methods. It will be apparent, however, to one skilled in the art that the present apparatus and systems may be practiced without these specific details. Reference in the specification to "an example" or similar language means that a particular feature, structure, or characteristic described in connection with that example is included as described, but may not be included in other examples.

Referring now to the drawings, FIG. 1 is a block diagram of an example power supply system 100 with an energy storage component 104, wherein the energy storage component 104 is to power a load 103 during transitions the primary power supply 101 and the secondary power supply 102. It should be understood that the example power supply system 100 depicted in FIG. 1 may include additional components and that some of the components described herein may be removed and/or modified without departing from a scope of the example power supply system 100.

The power supply system 100 comprises a primary power supply 101 that is energized by a primary independent source 106 of electrical energy and a secondary power supply 102 that is energized by a secondary independent source 107 of electrical energy. The primary power supply 101 is to power the load 103 until it is turned off. The primary power supply 101 may turn off in response to a failure, e.g., a failure in the primary power independent source 106, an internal failure of the power supply, etc.

The primary power supply 101 and the secondary power supply 102 are connected to the load 103 via a bus 105 through which the power is delivered from any of the power supplies 101,102 to the load 103. Each power supply 101, 102 is capable of providing all operating power to the load 103, such that complete redundancy is provided within the system 100. Besides, the power supply system 100 is configured such that there is always one of the available power supplies 101,102 operative to provide power to the load 103.

Additionally, the power supplies 101,102 can be respectively configured and coupled to one another so as to bi-directionally exchange signals. Such signals can includes status information, alerts and other signals as various events occur making such communications relevant. For example, primary power supply 101 and secondary power supply 102 may exchange status signals through the bus 105 such that a failure, the unavailability or the offline mode of one of the power supplies is transmitted to the other. The power supplies 101,102 may be also configured to bi-directionally exchange signals to the load 103.

In such example, the primary power supply 101 is to accommodate the electrical energy received from the primary source 106 and to deliver a first power to the load 103. In turn, the secondary power supply 102 is to accommodate the electrical energy received form the secondary source 107 and to deliver a second power to the load 103 in response to a failure in the primary power supply 101 that may provoke the primary power supply 101 to be taken out of its online mode. The first power and the second power allow the load 103 to operate at its normal functioning level. When the primary power supply 101 turns off, the primary storage power component 104 located within the primary power supply 101 and the secondary power supply 102 are turned on. For example, the primary power supply 101 instructs the primary storage power component 104 to turn on and send a status signal to the secondary power supply 102, for example indicating that a failure has happened, which causes the secondary power supply 102 to turn on. While the primary storage power component 104 is able to instantly deliver a third power (pre-stored power) to the load 103, the secondary power supply 102 has to transition from a lesser output power level, corresponding to the output level in its offline mode, to a greater output power level, corresponding to an output power level that allows the load 103 to function normally. In such example, the third power may be at the same full-rated power level than the first power. Once the secondary power supply 102 has reached the greater output level sends an status signal through the bus 105 to the primary storage power component 104 indicating that is fully operative which causes the primary storage power component 104 to turn off.

When the primary power supply 101 recovers from the failure, the secondary power supply 102 turns off and the primary storage power component 104 and the primary power supply 101 turn on. In such event, the primary power supply 101 activates the primary energy storage component 104 and sends a status signal to the secondary power supply 102 indicating that has recovered which causes the secondary power supply to turn off. Then, the primary power supply 101 has to transition from a lesser output power level, corresponding to the output level in its offline mode, to a greater output power level, corresponding to an output power level that allows the load 103 to function normally. Once the primary power supply 101 has reached the greater output level instructs the primary storage power component 104 to turn off.

In some other examples, the primary storage energy component 104, instead of being located within the primary power supply 101, may be external to the primary power supply 101 that is connected to the bus 105. In such examples, the power supplies 101,102 may send signals to the primary energy storage component 104 to turn on or off through the bus based on the current status (online/offline) of the power supplies 101,102.

Power supplies 101 and 102 can respectively include any circuitry, processor(s) or other resources as needed in order to perform in accordance with the present teachings. Such resources can include, for purposes of non-limiting illustration, one or more state machines, digital logic, analog circuitry, digital/analog hybrid circuitry, one or more processors or microcontrollers, lookup tables, voltage or current sensing elements, etc. One having ordinary skill in the electrical and related arts will appreciate that sensing and signaling instrumentation is well known, and that further particular elaboration is not required for an understanding of the present teachings.

As used herein, the "sources" 106,107 may be an energy source that provides the energy to the load 103. Examples of the power sources 106,107 include Alternating Current (AC) power sources, Direct Current (DC) power sources, power feeds, generators, power circuits, energy storages, power systems, or other type of voltage source capable of providing the input voltage and current to the rest of components of the power supply system 100 and to the load 103. In some examples, the power source 106 may be the energy source that pre-charges the primary energy storage component 104 prior to operation of the power supply system 100 and that re-charges the primary energy storage component 104 when has delivered at least part of the stored energy to the load 103.

As used herein, "energy storage components" 104 may be elements able to capture energy produced at one time, to store the captured energy for a period and to use the stored energy at a later time. Examples of energy storage components 104 may be capacitors, batteries, supercapacitors, hybrid-capacitor-battery components, combinations thereof, etc.

Figure 2:
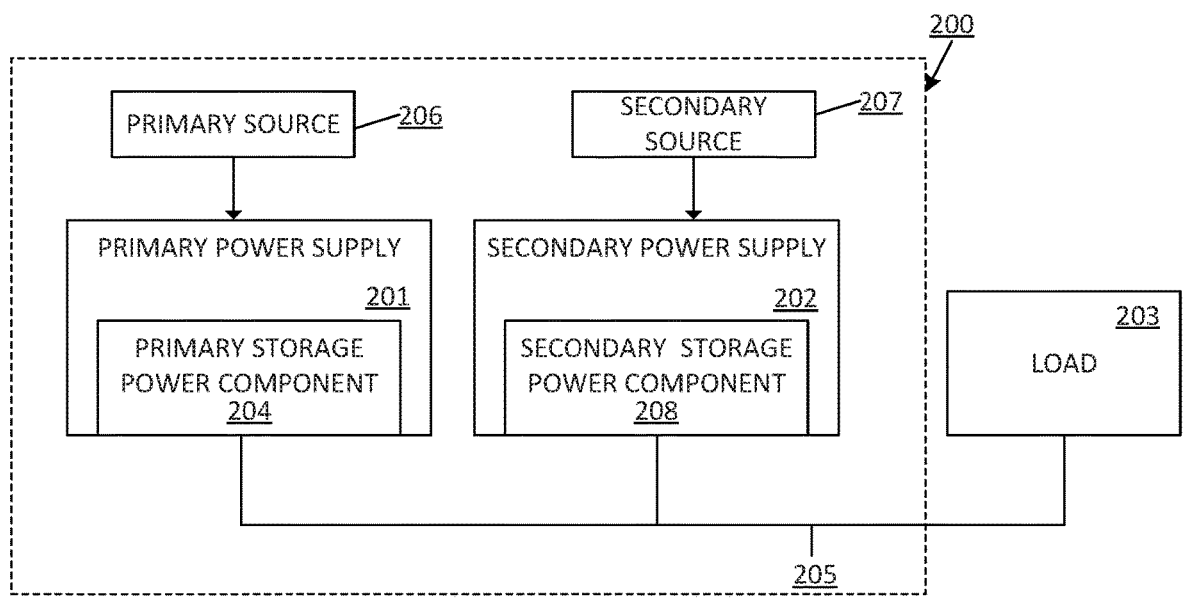
FIG. 2 is a block diagram of another example power supply system with energy storage components, wherein the energy storage components are to power the loads during transitions between power supplies, including an energy storage component in each power supply.

FIG. 2 is a block diagram of another example power supply system 200 with energy storage components 204, 208, wherein the energy storage components 204,208 are to power the load 203 during transitions between the primary power supply 201 and the secondary power supply 202, including an energy storage component 204,208 in each power supply 201,202. It should be understood that the example power supply system 200 depicted in FIG. 2 may include additional components and that some of the components described herein may be removed and/or modified without departing from a scope of the example power supply system 200.

The power supply system 200 comprises a primary power supply 201 to provide a first power to the load 203 and that is energized by a primary independent source 206 of electrical energy. The power supply system 200 further comprises a secondary power supply 202 that is to provide a second power to the load 203 and that is energized by a secondary independent source 207 of electrical energy. The primary power supply 201 is to provide the first power to the load 203 until it turns off, for example due to a failure. The primary power supply 201 comprises a primary energy storage component 204, e.g. a battery, that delivers instant energy to the load 203 in response to the primary power supply 201 turning off. The secondary power supply 202 also turns on in response to the primary power supply 201 turning off. The primary energy storage component 204 will be delivering a third power to the load 203 until the secondary power supply 202 transitions from a lesser output power level to a greater output power level. Once the secondary power supply 202 has reached the greater output level sends a status signal to the primary storage power component 204 through the bus 105 instructing it to turn off.

The secondary power supply 202 further comprises a secondary energy storage component 208, e.g. a battery, that instantly deliver a fourth power to the load 203 in response to the secondary power supply 202 turning off. In such example, when the primary power supply 201 recovers from failure, it turns on and instruct the secondary power supply 202 and the secondary energy storage component 208, e.g. by sending a status signal through the bus 205, to simultaneously turn off and on, respectively. The secondary energy storage component 208 will be instantly delivering the fourth power to the load 203 until the primary power supply 201 transitions from a lesser output power level to a greater output power level. Once the primary power supply 201 has reached the greater output level sends a status signal to the secondary storage power component 208 through the bus 205 instructing it to turn off.

In some other examples, the fourth power may be delivered by the primary energy storage component 204 and the secondary energy storage component 208, e.g., the primary energy storage component 204 may provide half of the power for the normal functioning of the load 203 and the secondary energy storage component 208 may provide the other half of the power.

The power supplies 201,202 and their respective energy storage components 204,208 are connected to the load 203 via a bus 205 through which the power is delivered from any of the power supplies 201,202 and energy storage components 204, 208 to the load 203. Each power supply 201,202 is capable of providing all operating power to the load 203, such that complete redundancy is provided within the system 200. Besides the power supply system 200 is configured such that there is always one of the available power supplies 201,202 operative to provide power to the load 203.

In some other examples, the storage energy component 204,208 instead of being located within the respective power supplies 201,202 may be external to them. In such examples, the power supplies 201,202 may send signals to the energy storage component 204,208 to turn on or off through the bus based on the current status (online/offline) of the power supplies 201,202.

Figure 3:
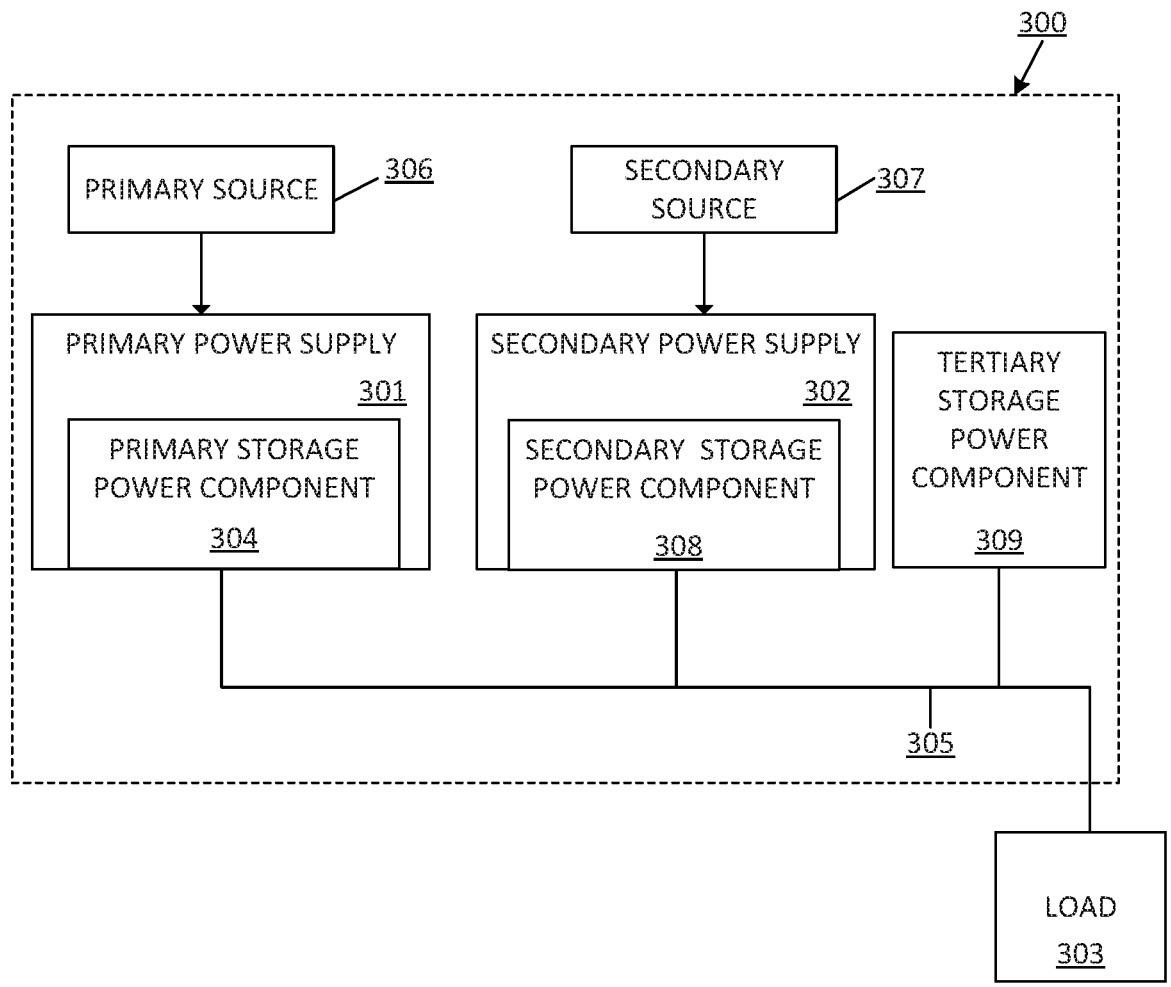
FIG. 3 is a block diagram of another example power supply system with energy storage components, including an energy storage component in each power supply and an additional energy storage component external to the power supplies.

FIG. 3 is a block diagram of another example power supply system 300 with energy storage components 304, 308, including an additional energy storage component 309 external to the power supplies. It should be understood that the example power supply system 300 depicted in FIG. 3 may include additional components and that some of the components described herein may be removed and/or modified without departing from a scope of the example power supply system 300.

The power supply system 300 of FIG. 3 is substantially similar to the power supply system 200 of FIG. 2 but including a tertiary energy storage component 309 that is used to provide additional powering to the load 303. The primary energy storage component 304 and the secondary energy storage component 308 can store a limited amount of energy that in some cases may not be enough to power the load 303 during the transitions between the power supplies 301,302. Said transitions may take a few seconds. In those cases, when the power supply that is being activated has not reached its greater output power level yet and the energy storage component coupled to the power supplies that are currently providing power to the load is exhausted, the tertiary energy storage component 309 starts powering the load 303 until the corresponding power supply is at its full-rated power level. For example, the energy storage component that is exhausted sends an alert signal to the tertiary energy storage component 309 to start powering the load 303. Once the corresponding power supply is fully-operative, it sends a status signal to the tertiary storage power component 309 through the bus 205 instructing it to turn off. The tertiary energy storage component 309 can be pre-energized or re-energized by any of the primary and secondary independent sources 306,307 via the respective power supplies 301,302 through the bus 305.

While FIG. 3 shows one single external energy storage component, the power supply system may comprise any number of external energy storage components to power the loads during the transitions of the power supplies. The number of external energy storage components may depend on the power requirements of the loads.

Figure 4:
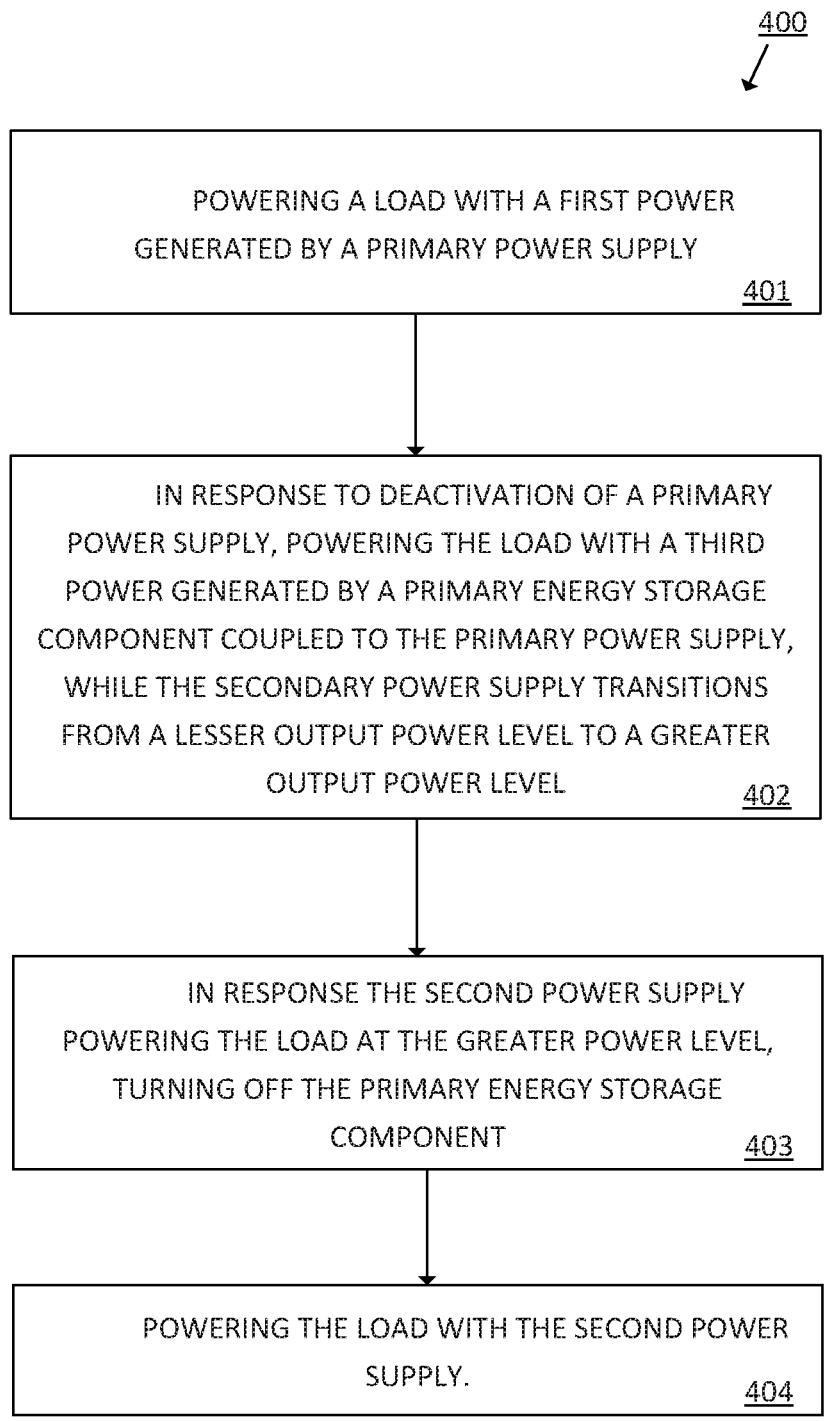
FIG. 4 is an example method for powering a load by storage energy components during transitions between power supplies.

FIG. 4 is a flowchart of an example method 400 for powering a load by storage energy components during transitions between power supplies. Although execution of method 400 is described below with reference to the power supply 100 of FIG. 1, other suitable power supplies or systems for the execution of method 400 may be utilized, such as power supplies of FIGS. 2 and 3. Additionally, implementation of method 400 is not limited to such examples.

At block 401 of method 400, the primary power supply 101 provides a first power to a load 103, while a secondary power supply 102 is in an offline mode. This first power provides full, normal operating power to the load 103.

At 402 of the method 400, the primary power supply 101 is, due to a failure, at least partially deactivated failing to provide at least part of the operating power to the load 103. In response to deactivation of the primary power supply 101, the primary energy storage component 104 coupled to the primary power supply 101 is activated instantly providing a third power to the load 103 and the secondary power supply 102 is also activated. The primary energy storage component 104 provides the third power to the load 103 while the secondary power supply 102 transitions from its offline mode to an output power level corresponding to its full-rated power level. Once the secondary power supply 102 reaches the greater output power level, the primary energy storage component 104 turns off and the load 103 is powered by the secondary power supply 102.

Then, the primary energy storage component 104 continues to provide energy to the load while the secondary power supply 102 transitions to a full (i.e., normal) output mode. For purposes of the example, the primary energy storage component 104 may include capacitors or other internal storage (not shown) sufficient to provide conditioned power to the load 103 while the secondary power supply 102 transitions from offline mode (i.e., no output) to full power output mode.

At 403 of the method 400, in response to the secondary power supply 102 powering the load at the greater power level, the primary energy storage component 104 is turned off. For example, the secondary power supply 102 once has reached its greater power level sends and status signal indicating that it is fully operative to the primary power supply 101 that cause the deactivation of the primary energy storage component 104.

At 404 of the method 400, the load 103 is powered by the secondary power supply 102.

In some examples, the secondary power supply 102 further comprises a secondary energy storage component that instantly deliver a fourth power to the load 103 in response to the secondary power supply 102 turning off. In such example, when the primary power supply 201 turns on it sends a status signal to the secondary power supply 102 to simultaneously turn off said secondary power supply 102 and to turn on the secondary energy storage component. The secondary energy storage component will be instantly delivering the fourth power to the load until the primary power supply 101 transitions from a lesser output power level to a greater output power level. Once the primary power supply 101 reaches the greater output level sends a status signal to the secondary storage power component to turn off and the primary power supply 101 start powering the load 103.

Figure 5:
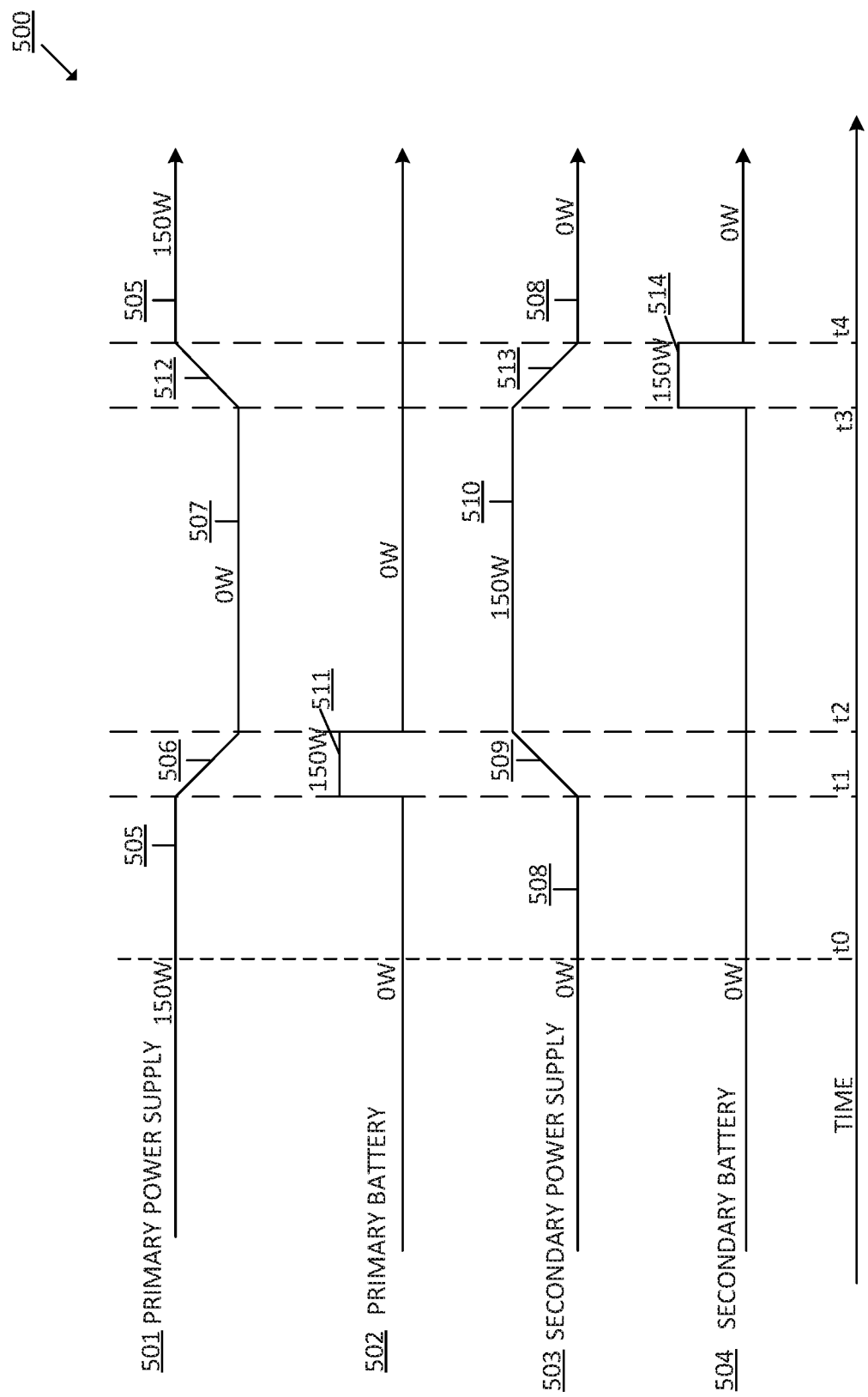
FIG. 5 is an example signal timing diagram according to an example method for powering a load by storage energy components during transitions between power supplies.

FIG. 5 is an example signal timing diagram 500 according to an example method for powering a load by storage energy components during transitions between power supplies.

The diagram 500 includes the output voltages of a primary power supply 501, a primary battery 502 coupled to the primary power supply 501, a secondary power supply 503 and a secondary battery 504 coupled to the secondary power supply 503.

In such example, the load demands 150 watts for its normal functioning. This power is firstly delivered by the primary power supply 501 until a failure happens at "t1". As depicted, the voltage of the primary power supply drops 506 from a full operating level 505 to an insufficient level until is completely deactivated 507 (offline mode) at "t2".

The diagram 500 also includes an output voltage 310 provided by the secondary (backup) power supply 503. The voltage of the secondary power supply 503 is initially at a standby (zero) output level 508. Then, at "t1" the voltage 310, in response to the failure in the primary power supply 501, begins to transition 509 towards a full output level 510 that is reached at "t2". For example, the transition 509 from the zero level 508 toward full output level 510 is triggered by an alert, activation or other signal provided by the primary power supply 501 to the secondary power supply 503. In response to the failure of the primary power supply 501 at "t1" the primary battery 502, that is coupled to the primary power supply 501, is also activated and instantly provides a third power 511 to the load. The primary battery 502 instantly powers the load with 150 watts. Once the secondary power supply reaches its full output level 510 of 150 watts at "t2", the primary battery 502 deactivates and the load is entirely powered by the secondary power supply 503 between "t2" and "t3".

At "t3" the primary power supply 501 start recovering from failure and begins to transition 512 toward its full output level 505 that is reached at "t4". In response to the primary power supply 501 recovering form failure, the secondary power supply is deactivated transitioning 513 to its zero output level 508 and the secondary battery 504, that is coupled to the secondary power supply 502, is activated to instantly provide a fourth power 514 to the load. For example, the primary power supply 501 may inform the secondary power supply 503 that is recovering form failure by triggering an alert, activation or other signal provided by the primary power supply 501 to the secondary power supply 503. The secondary battery 504 instantly provides the fourth power 514 to the load until the primary power supply 501 its full output level 505 at "t4".

In some examples, the primary battery 502 and the secondary battery 504 may be powering the load during transition periods "t1"-"t2" and "t3"-"t4" by, for example, providing 75 watts each battery.

Figure 6:
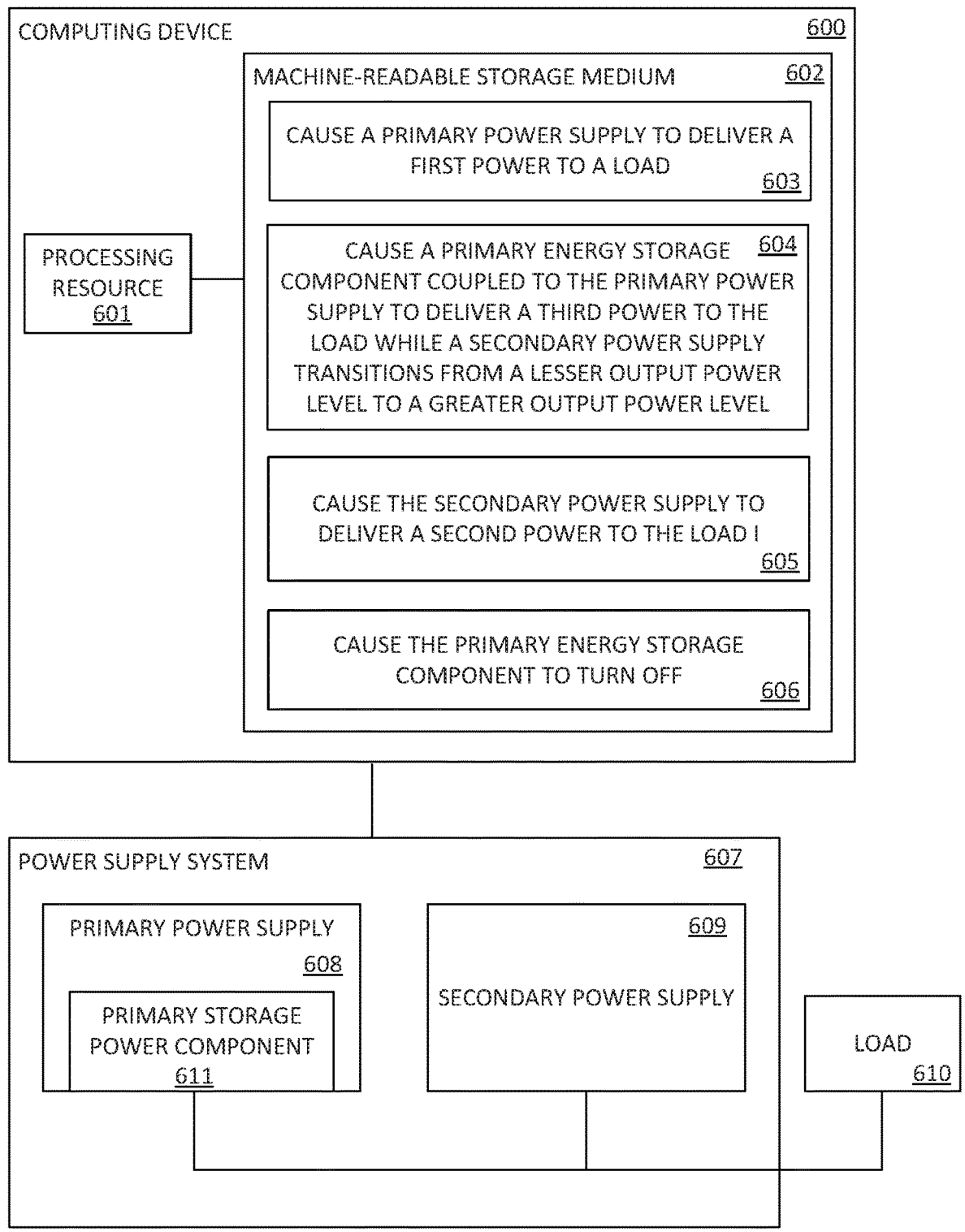
FIG. 6 is a block diagram of an example computing device with a processing resource to execute instructions in a machine-readable storage medium for powering a load by storage energy components during transitions between power supplies.

FIG. 6 is a block diagram of an example computing device with a processing resource to execute instructions in a machine-readable storage medium for powering a load by storage energy components during transitions between power supplies. It should be understood that the computing device 600 depicted in FIG. 6 may include additional components and that some of the components described herein may be removed and/or modified without departing from a scope of the computing device 600.

The computing device 600 is depicted as including a processing resource 601 to execute instruction 603-606 in a machine-readable storage medium 602. Specifically, the processing resource 601 of the computing device 600 executes instructions 603 to cause the primary power supply 608 to deliver a first power to the load 610.

The processing resource 601 of the computing device 600 also executes instructions 604 to, in response to a failure of the primary power supply 608, cause the primary energy storage component 611 coupled to the primary power supply 608 to deliver a third power to the load 610 while the secondary power supply 609 transitions from a lesser output power level to a greater output power level and wherein the third power is at the same full-rated power level of the first power.

The processing resource 601 of the computing device 600 also executes instructions 605 to, in response the second power supply 609 reaching the greater output power level, cause the secondary power supply 609 to deliver a second power to the load 610. The processing resource 601 of the computing device 600 also executes instructions 606 to cause the primary energy storage component 611 to turn off.

In some examples, the processing resource 601 of the computing device 600 may execute further instructions to, in response to the primary power supply 608 recovering from the failure, cause the primary energy storage component 611 to power the load 610 with the third power while the primary power supply 608 transitions from a lesser output power level to a greater output power level. The instructions are further to, in response the primary power supply 608 reaching the greater output power level, cause the primary power supply 608 to provide the load 610 with the first power, cause the primary energy storage component 611 to turn off and cause the secondary power supply 609 to turn off.

As used herein, a "processing resource" 601 may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 601 may fetch, decode, and execute instructions stored on machine-readable storage medium 602 to perform the functionalities described above in relation to instructions 603-606. Processing resource 601 may fetch, decode, and execute instructions stored on machine-readable storage medium 602 to perform the functionalities described above in relation to instructions 603-606. In other examples, the functionalities of the instructions of the machine-readable storage medium 602 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, respective instructions 603-606, may be part of an installation package that, when installed, may be executed by the processing resource 601 to implement the functionalities described above. In such examples, machine-readable storage medium 602 may be a portable medium, such as a CD, DVD, or flash drive, or a memory maintained by a server from which the installation package can be downloaded and installed. In other examples, instructions 603-606 may be respectively part of an application, applications, or component(s) already installed on devices including processing resource 601. In such examples, the memory-readable storage medium 602 may include memory such as a hard drive, solid state drive, or the like. In some examples, functionalities described herein in relation to FIG. 6 may be provided in combination with functionalities described herein in relation to any of FIGS. 1-5.

All of the features disclosed in this specification (including any accompanying claims, abstract and drawings), and/or all of the elements of any method or process so disclosed, may be combined in any combination, except combinations where at least some of such features and/or elements are mutually exclusive.

The invention claimed is:

1. A power supply system comprising:
a primary power supply to deliver a first power to a load;
a secondary power supply that, in response to a failure in the primary power supply, is to deliver a second power to the load; and
a primary energy storage component coupled to the primary power supply that, in response to the failure in the primary power supply, is to deliver a third power to the load while the secondary power supply transitions from a lesser output power level to a greater output power level and wherein the third power is at the same full-rated power level of the first power;
wherein the primary energy storage component is to deliver the third power to the load in response to detecting the first power below a power threshold.

2. The power supply system of claim 1, wherein, in response to the primary power supply recovering from the failure, the primary energy storage component is to deliver the third power to the load while the primary power supply transitions from a lesser output power level to a greater output power level and the primary power supply is to deliver the first power to the load.

3. The power supply system of claim 1, comprising:
a secondary energy storage component coupled to the secondary power supply; and
wherein, in response to the failure in the primary power supply, the primary energy storage component and the secondary energy storage component are to deliver the third power to the load while the secondary power supply transitions from the lesser output power level to the greater output power level.

4. The power supply system of claim 1, comprising:
a secondary energy storage component coupled to the secondary power supply;
wherein, in response to a failure in the secondary power supply, the primary power supply is to deliver the first power to the load and the secondary energy storage component is to deliver a fourth power to the load while the primary power supply transitions from a lesser output power level to a greater output power level; and
wherein the fourth power is at the same full-rated power level of the second power.

5. The power supply system of claim 4, wherein, in response to the failure in the secondary power supply, the primary energy storage component and the secondary energy storage component are to deliver the fourth power to the load while the primary power supply transitions from a lesser output power level to a greater output power level.

6. The power supply system of claim 1, wherein the lesser output power level of the secondary power supply is an initialization output power level of the secondary power supply and the greater output power level of the secondary power supply is a full-rated output power level of the secondary power supply.

7. The power supply system of claim 2, wherein the lesser output power level of the primary power supply is an initialization output power level of the primary power supply and the greater output power level of the primary power supply is a full-rated output power level of the primary power supply.

8. The power supply system of claim 4, wherein the secondary energy storage component is to deliver the fourth power to the load in response to detecting the second power below the power threshold.

9. The power supply system of claim 1, wherein the primary energy storage component and the secondary energy storage component are components selected from a group comprising capacitors, supercapacitors, batteries, hybrid-capacitor-battery components and combinations thereof, respectively.

10. The power supply system of claim 1, wherein the load is selected from a group comprising a server assembly, an IT load, a networking infrastructure and a storage infrastructure.

11. A method comprising:
powering a load with a first power generated by a primary power supply;
in response to a failure of the primary power supply, powering the load with a third power generated by a primary energy storage component coupled to the primary power supply while a secondary power supply transitions from a lesser output power level to a greater output power level and wherein the third power is at the same full-rated power level of the first power; and
in response to the secondary power supply reaching the greater output power level, turning off the primary energy storage component; and
powering the load with the secondary power supply;
determining if the first power provided by the primary power supply is below a power threshold; and
powering the load with the third power when it is determined that the first power is below the power threshold.

12. The method of claim 11, comprising:
in response to the primary power supply recovering from the failure, powering the load with the third power while the primary power supply transitions from a lesser output power level to a greater output power level; and
in response to the primary power supply reaching the greater output power level, powering the load with the primary power supply;
turning off the primary energy storage component; and
turning off the secondary power supply.

13. The method of claim 11, comprising:
in response to the failure in the primary power supply, powering the load with the third power that is delivered by the primary energy storage component and the secondary energy storage component while the secondary power supply transitions from the lesser output power level to the greater output power level.

14. The method of claim 11, comprising:
in response to a failure of the secondary power supply, powering the load with a fourth power generated by a secondary energy storage component coupled to the secondary power supply while the primary power supply transitions from a lesser output power level to a greater output power level and wherein the fourth power is at the same full-rated power level of the second power; and
in response to the primary power supply reaching the greater output power level, turning off the secondary energy storage component; and
powering the load with the primary power supply.

15. The method of claim 14, comprising:
in response to the failure in the secondary power supply, powering the load with the fourth power that is delivered by the primary energy storage component and the secondary energy storage component while the primary power supply transitions from the lesser output power level to the greater output power level.

16. The method of claim 11, comprising:
powering the load with the second power when the secondary power supply has reached the greater output power level; and
turning off the primary energy storage component.

17. The method of claim 13, comprising:
determining if the second power provided by the secondary power supply is below the power threshold;
powering the load with the fourth power when it is determined that the second power is below the power threshold;
powering the load with the first power when the primary power supply has reached the greater output power level; and
turning off the secondary energy storage component.

18. A non-transitory machine-readable storage medium comprising instructions that when executed by a processor causes the processor to:
cause a primary power supply to deliver a first power to a load;
in response to a failure of the primary power supply, cause a primary energy storage component coupled to the primary power supply to deliver a third power to the load while a secondary power supply transitions from a lesser output power level to a greater output power level and wherein the third power is at the same full-rated power level of the first power;
in response to the secondary power supply reaching the greater output power level, cause the secondary power supply to deliver a second power to the load; and
cause the primary energy storage component to turn off;
wherein the primary energy storage component is to deliver the third power to the load in response to detecting the first power below a power threshold.

19. The non-transitory machine-readable storage medium of claim 18, comprising further instructions to:
in response to the primary power supply recovering from the failure, cause the primary energy storage component to power the load with the third power while the primary power supply transitions from a lesser output power level to a greater output power level;
in response to the primary power supply reaching the greater output power level, cause the primary power supply to provide the load with the first power;
cause the primary energy storage component to turn off; and
cause the secondary power supply to turn off.

* * * * *